(12) United States Patent
Shieh (10) Patent No.: US 6,933,710 B2
(45) Date of Patent: Aug. 23, 2005

(54) SOFT START TECHNIQUES FOR CONTROL LOOPS THAT REGULATE DC/DC CONVERTERS

(75) Inventor: Crown-Sen Shieh, Santa Clara, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 42 days.

(21) Appl. No.: 10/370,047

(22) Filed: Feb. 18, 2003

(65) Prior Publication Data

US 2004/0022078 A1 Feb. 5, 2004

Related U.S. Application Data

(60) Provisional application No. 60/358,484, filed on Feb. 19, 2002.

(51) Int. Cl.[7] .................................................. G05F 1/40
(52) U.S. Cl. ......................... 323/282; 323/285; 363/91
(58) Field of Search ............................... 323/271, 272, 323/273, 282, 225, 262, 284, 283, 285, 286, 222, 265, 277; 363/25, 133, 24, 56, 131, 55, 91, 39, 41, 65, 56.1, 43, 71, 72

(56) References Cited

U.S. PATENT DOCUMENTS

| 4,630,187 A | * | 12/1986 | Henze | 363/41 |
|---|---|---|---|---|
| 4,845,605 A | * | 7/1989 | Steigerwald | 363/21.03 |
| 4,930,063 A | * | 5/1990 | Henze et al. | 363/91 |
| 5,821,740 A | * | 10/1998 | Hodgins et al. | 323/277 |
| 6,055,162 A | * | 4/2000 | Tarrillo et al. | 363/25 |
| 6,137,274 A | * | 10/2000 | Rajagopalan | 323/272 |
| 6,316,926 B1 | * | 11/2001 | Savo et al. | 323/282 |

* cited by examiner

*Primary Examiner*—Rajnikant B. Patel
(74) *Attorney, Agent, or Firm*—Townsend and Townsend and Crew LLP (57) ABSTRACT

Improved soft start techniques for control loops that regulate DC/DC converter circuits are provided. An improved soft start circuit provides a varying voltage at the output of an error amplifier in the control loop during the start-up phase of the DC/DC converter. The varying voltage generated by an improved soft start circuit is related to the amplitude of the saw-tooth ramp signal that controls the switching duty cycle. The varying voltage generated by an improved soft start circuit is also related to the switching frequency of the DC/DC converter. These features allow the duty cycle of the DC/DC converter to gradually increase from zero during power-on. An effective soft start function is provided for DC/DC converters that have a variable switching frequency or a variable saw-tooth ramp signal.

28 Claims, 4 Drawing Sheets

SOFT START TECHNIQUES FOR CONTROL LOOPS THAT REGULATE DC/DC CONVERTERS

CROSS-REFERENCES TO RELATED APPLICATIONS

This patent application claims the benefit of U.S. Provisional Patent Application No. 60/358,484, filed Feb. 19, 2002, which is incorporated by reference herein.

BACKGROUND OF THE INVENTION

The present invention relates to soft-start techniques for control loops that regulate DC/DC converters, and in particular, soft-start circuits and methods that control the output of an error amplifier in response to a ramp signal and a switching frequency of the DC/DC converter.

Figure 1:
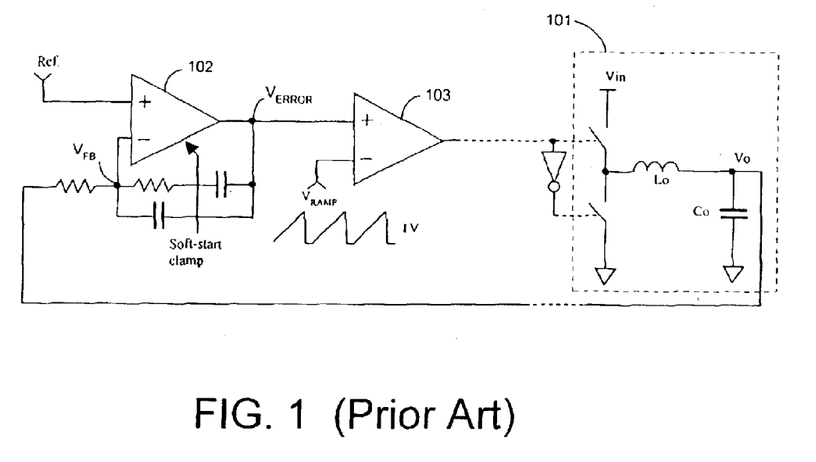
FIG. 1 illustrates a prior art control loop for a PWM DC/DC converter circuit.

A DC/DC converter is a circuit that provides output current to a load at a regulated output voltage $V_O$ in response to a unregulated input voltage $V_{IN}$. DC/DC converters are well known to those of skill in the art. A typical DC/DC converter design is shown in FIG. 1.

DC/DC converter 101 provides current from $V_{IN}$ to the load through two synchronously operated switches. Output inductor Lo smoothes the output current, and output capacitor Co smoothes the output voltage. DC/DC converter 101 is referred to as a buck converter, because it steps down $V_{IN}$ to a lower voltage $V_O$.

Error Amplifier 102 receives a feedback signal $V_{FB}$ from the output voltage $V_O$ and generates an error signal $V_{ERROR}$ at the input of PWM comparator 103. Pulse width modulation (PWM) is a commonly employed circuit technique in the control loop of a DC/DC converter. Comparator 103 receives $V_{ERROR}$ at its non-inverting input and a ramp voltage $V_{RAMP}$ at its inverting input. Comparator 103 transforms $V_{ERROR}$ into a duty cycle for the two switches in DC/DC converter 101.

During the power-on phase of converter 101, the output voltage of error amplifier 102 is clamped and released gradually to allow the duty cycle of the DC/DC converter switches to increase slowly from zero. Error amplifier 102 has a soft-start clamp circuit that performs this function during power-on. Soft-start clamp circuitry prevents inrush current into the empty output capacitor.

Figure 2:
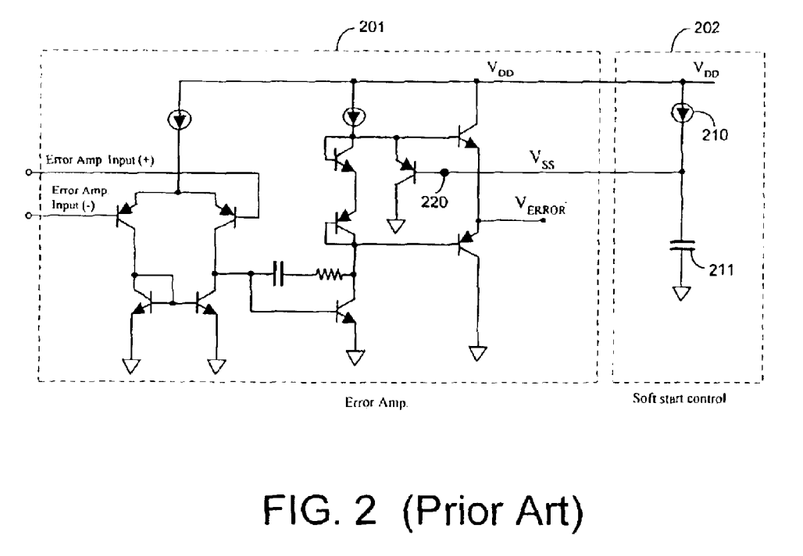
FIG. 2 illustrates a prior art error amplifier and a soft start clamp circuit that are used in a control loop of a DC/DC converter.

FIG. 2 illustrates an example of a conventional soft-start clamp circuit 202 that is coupled to an error amplifier 201 in a DC/DC converter. An example of an error amplifier 201 is also shown in FIG. 2. Soft-start clamp circuit 202 includes a constant current source 210 and a capacitor 211. Circuit 202 generates a very slow-sloped ramp voltage $V_{SS}$ that clamps the output voltage $V_{ERROR}$ of error amplifier 201.

There are a number of problems with the soft-start clamp circuit shown in FIG. 2. One potential problem relates to the voltage range of voltage $V_{SS}$. If the voltage range of voltage $V_{SS}$ is far beyond the voltage range of the ramp voltage $V_{RAMP}$, circuit 202 does not provide an effective soft-start function that controls the duty cycle of the switches to prevent inrush current into output capacitor Co.

For example, $V_{RAMP}$ has a voltage amplitude of 1 volt in FIG. 1. The 1 volt amplitude may, for example, exist over a range from 2 volts to 3 volts. On the other hand, the range of $V_{SS}$ starts from 0 volts and increases to a maximum value of the supply voltage $V_{DD}$ (e.g., 5 volts) in FIG. 2.

Soft-start circuit 202 does not begin to control the duty cycle of the switches in converter 101, until capacitor 211 has been charged from 0 volts to 2 volts. Once capacitor 211 has been charged to 3 volts, the maximum duty cycle (100%) of the switches is reached, and soft-start circuit 202 no longer reduces the duty cycle of the switches.

Thus, soft-start circuit 202 does not correlate $V_{SS}$ with the amplitude of $V_{RAMP}$. Also, soft-start circuit 202 does not correlate $V_{SS}$ with switching frequency of the switches in converter 101.

Figure 3:
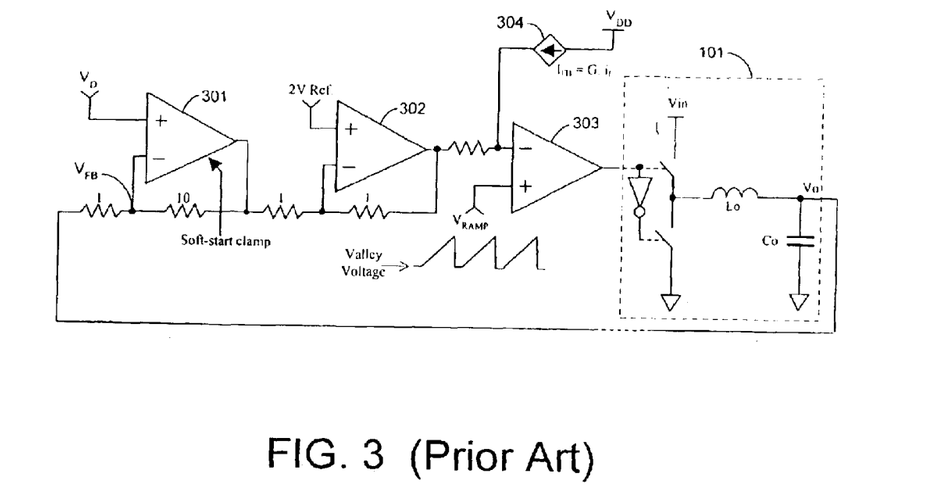
FIG. 3 illustrates another prior art control loop for a PWM DC/DC converter circuit.

FIG. 3 illustrates another prior art control loop for a DC/DC converter 101. The control loop of FIG. 3 was implemented for high speed central processing unit (CPU) applications. The control loop of FIG. 3 employs a low gain, wide bandwidth error amplifier 301 with summing mode and droop control. Error amplifier 301 amplifies the difference between feedback voltage $V_{FB}$ and a reference voltage $V_D$. $V_D$ is a target output voltage for $V_O$. $V_D$ is generated by a digital-to-analog converter. The numbers over the resistors represent resistance values in kilo-ohms.

The control loop of FIG. 3 also has a unity gain buffer 302 and a PWM comparator 303. Comparator 303 compares ramp voltage $V_{RAMP}$ with the output of buffer 302 and a current feedback signal $I_{FB}$. The current feedback signal $I_{FB}$ is a function of the instantaneous inductor current $I_L$ and the current gain G of the inductor Lo.

In the control loop of FIG. 3, a technique referred to as feed-forward compensation (FFC) is employed. According to this technique, voltage $V_{RAMP}$ is a function of both the input voltage $V_{IN}$ and the target output voltage $V_D$.

The valley voltage of $V_{RAMP}$ in FIG. 3 equals 3 volts–$(K \times V_D)$, where $V_D$ is the target output voltage. K equals $1-(1/V_{IN})$. The peak-to-peak amplitude of $V_{RAMP}$ is a constant value of 1 volt. Thus, voltage $V_{RAMP}$ is adjusted along with the input voltage $V_{IN}$ and the target output voltage.

In the control loop of FIG. 3, the conventional soft-start control circuit 202 is also not effective, because the soft-start voltage $V_{SS}$ is independent of the amplitude of $V_{RAMP}$ and the switching frequency of the switches.

Therefore, there is a need for an improved soft-start implementation that is capable of tracking variations in the operational parameters of a control loop such as the amplitude of the ramp voltage and the switching frequency of the switches in a DC/DC converter.

BRIEF SUMMARY OF THE INVENTION

The present invention provides improved soft start techniques for control loops that regulate DC/DC converter circuits. The present invention includes soft start circuits and methods for allowing the duty cycle of one or more switches in a DC/DC converter to increase slowly from zero during the power-on phase to prevent inrush current into the output capacitor.

The control loop of a DC/DC converter includes an error amplifier. A soft start circuit of the present invention provides a varying voltage at the output of the error amplifier during the power-on phase of the DC/DC converter.

The control loop of the DC/DC converter also includes a pulse width modulated (PWM) comparator that receives a saw-tooth PWM ramp signal. The PWM comparator uses the saw-tooth ramp signal to control the duty cycle of the one or more switches in the DC/DC converter.

The varying voltage generated by a soft start circuit of the present invention is related to the amplitude of the saw-tooth ramp signal. The varying voltage generated by a soft start circuit of the present invention is also related to the switching frequency of the one or more switches in the DC/DC converter.

These features of the present invention allow the duty cycle of the output switches to gradually increase from zero during power-on. The techniques of the present invention provide an effective soft start function, even for a DC/DC converter that has a variable switching frequency or a variable saw-tooth ramp signal.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 4:
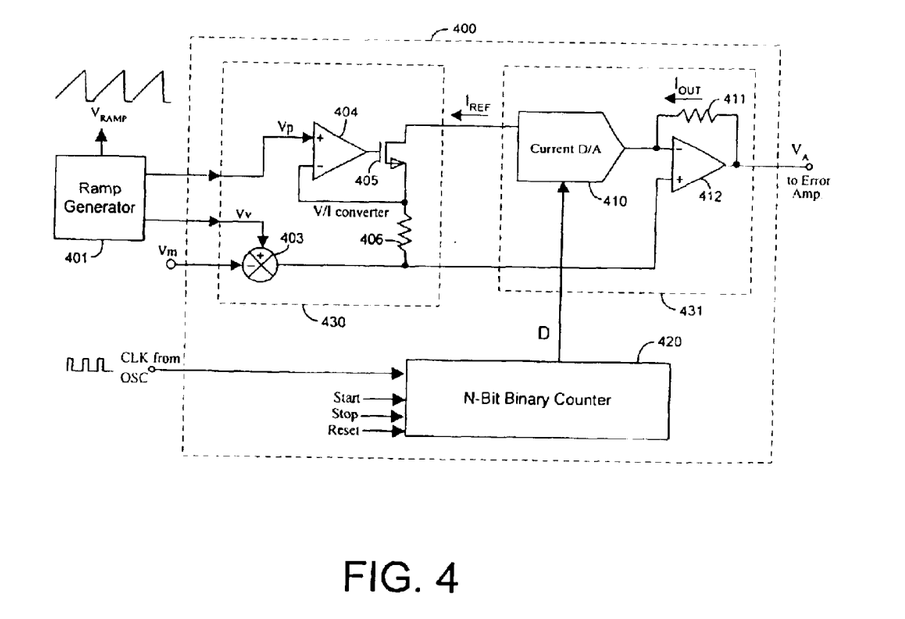
FIG. 4 illustrates an embodiment of a soft start control circuit according to the principles of the present invention.

FIG. 4 illustrates an embodiment of a soft start clamp circuit that operates according to the principles of the present invention. Soft start clamp circuit 400 receives two voltage signals $V_P$ and $V_V$ from ramp generator circuit 401. Ramp generator circuit generates saw-tooth ramp voltage $V_{RAMP}$. Voltage $V_{RAMP}$ is applied to an input of PWM comparator 103 or 303 to control the frequency of the switches in a DC/DC converter, as discussed above.

Voltage $V_{RAMP}$ is periodic signal that varies between a peak voltage $V_P$ and a valley voltage $V_V$. The amplitude of voltage signal $V_{RAMP}$ is the difference between $V_P$ and $V_V$. Ramp generator 401 provides voltages $V_P$ and $V_V$ to inputs of soft start clamp circuit 400 as shown in FIG. 4.

The voltages $V_P$ and $V_V$ provided by ramp generator 401 represent ideal values for the peak and valley voltages of $V_{RAMP}$. However, temperature, supply voltage, or process variations can cause the actual peak and valley voltages of the $V_{RAMP}$ signal to vary from voltages $V_P$ and $V_V$.

In these instances, a margin voltage $V_M$ is also applied to an input of circuit 400. Margin voltage $V_M$ accounts for any offsets between $V_V$ and the actual valley voltage of $V_{RAMP}$. Margin voltage $V_M$ can be a user input value or generated by a circuit.

Circuit 400 includes a voltage-to-current converter circuit 430, an N-bit binary counter circuit 420, and a binary weighted current digital-to-analog converter circuit 431. Voltage-to-current converter circuit 430 receives ramp signal voltages $V_P$, $V_V$, and $V_M$ and converts these voltages into a current signal $I_{REF}$.

N-bit binary counter circuit 420 receives a clock signal CLK from the oscillator that is used to generate $V_{RAMP}$. Clock signal CLK determines the frequency of the switches in the DC/DC converter. N-bit binary counter 420 generates a digital signal D. The rate of increase of digital signal D is indicative of the frequency of clock signal CLK.

Digital-to-analog converter circuit 431 provides an analog voltage signal $V_A$ in response to the current signal $I_{REF}$. Signal $V_A$ is an increasing voltage signal. Signal $V_A$ rises at a rate that is dependent on the frequency of clock signal CLK. Signal $V_A$ rises at a faster rate as the frequency of clock signal CLK increases. Signal $V_A$ rises at a slower rate as the frequency of clock signal CLK decreases.

Soft start clamp circuit 400 replaces prior art soft start circuit 202. Analog output voltage $V_A$ from circuit 400 can be provided to node 220 of error amplifier 201 in FIG. 2 (or any other suitable error amplifier in a DC/DC converter control loop). Analog output voltage $V_A$ controls the soft start function of a DC/DC converter by reducing the duty cycle of the switches (to less than 100%) until the output voltage on output capacitor Co reaches the regulated value to prevent inrush current into Co.

Further details of the present invention are now discussed. Referring to circuit 430, voltage $V_P$ is applied to the non-inverting input of operational amplifier 404. Voltages $V_V$ and $V_M$ are applied to an adder circuit 403. Adder circuit 403 subtracts $V_M$ from $V_V$ and applies the difference to the non-inverting input of amplifier 412 and to resistor 406.

Amplifier 404 controls the current through MOSFET 405 and resistor 406. Amplifier 404 drives transistor 405 so that the voltages at the inverting and non-inverting inputs of amplifier 404 are approximately equal to each other. Thus, the voltage at the inverting input of amplifier 404 equals about $V_P$. The current output $I_{REF}$ of circuit 430 is determined by the voltage across resistor 406 ($R_{406}$) as shown by equation (1):

$$I_{REF} = \frac{V_P - V_V + V_M}{R_{406}} \tag{1}$$

Thus, the magnitude of the output current $I_{REF}$ of voltage-to-current converter circuit 430 is dependent on the amplitude of $V_{RAMP}$ and $V_M$.

Figure 5:
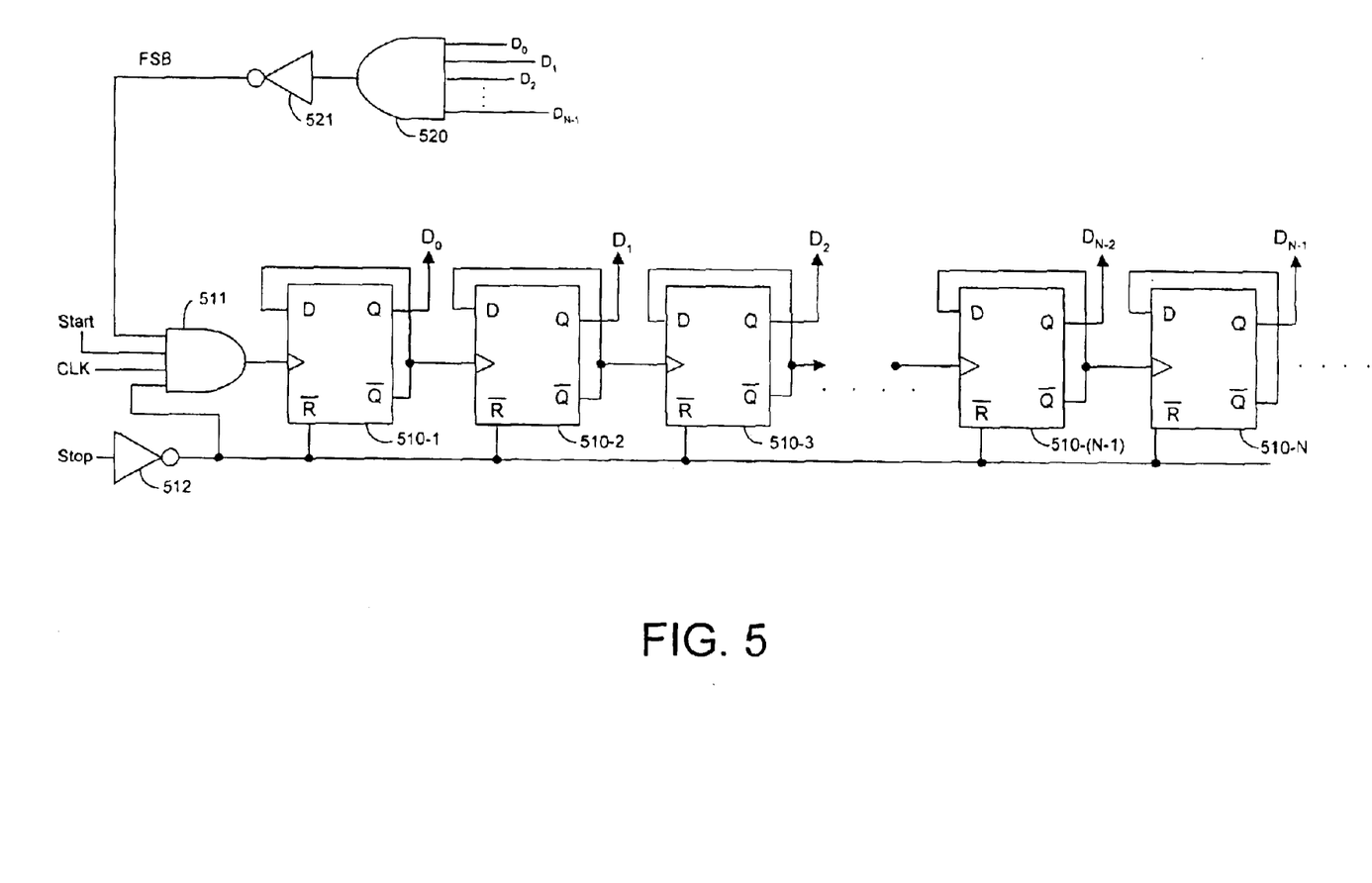
FIG. 5 illustrates an embodiment of an N-bit binary counter block according to the present invention.

Soft start clamp circuit 400 also includes N-bit binary counter circuit 420. Circuit 420 receives clock signal CLK as discussed above. A detailed diagram illustrating an example of circuit 420 is shown in FIG. 5. The circuit of FIG. 5 includes N cascaded flip-flops 510 that generate an N bit long binary signal D. As an example, N equals 11. Each binary bit of signal D is a logic high or a logic low.

In the circuit of FIG. 5, the clock signal CLK, a Start voltage signal, and an FSB voltage signal are provided to an AND gate 511. The output of AND gate 511 is coupled to a clock input of flip-flop 510-1. The Q bar output of each of flip-flops 510 generates a signal that is transmitted to the D input of the same flip-flop and the clock input of the next flip-flop in the chain. The Q output of each of flip-flops 510 provides one of the N bits of binary signal D.

Each of the N bits of binary output signal D are fed back into an AND gate 520 as shown in FIG. 5. The output of AND gate 520 is coupled to an inverter 521. The output signal of inverter 521 is FSB. Voltage signal FSB is provided to an input of AND gate 511.

The Start signal goes high at the end of an under-voltage lock out period during a power-on phase of the DC/DC converter. When at least one of the bits of the binary output signal D are low, the FSB voltage signal is high. Thus, when CLK goes high on a rising edge, the output of AND gate 511 goes high.

Initially, all of N bits of binary output signal D are low, and the signals at the D inputs of flip-flops 510 are high.

When the output of AND 511 at the clock input of flip-flop 510-1 goes high, the Q output signal $D_0$ of flip-flop 510-1 goes high, and the Q bar output signal of flip-flop 510-1 to go low. The Q bar output signal is provided to the D input of flip-flop 510-1 and the clock input of flip-flop 510-2.

On the second rising edge of CLK, the Q output $D_0$ of flip-flop 510-1 goes low, because the signal at its D input is low. When the Q bar output of flip-flop 510-1 goes high, the high signal at the D input of flip-flop 510-2 is passed to the Q output $D_1$ of flip-flop 510-2. The Q bar output signal of flip-flop 510-2 then goes low.

On the third rising edge of CLK, the Q output $D_0$ of flip-flop 510-1 goes high, because the signal at its D input is high. At this point in time, both $D_0$ and $D_1$ are high.

In general, the binary value of signal D in FIG. 5 increases by 1 on each rising edge of the clock signal CLK. Thus, the value of D is a binary count of the number of pulses in CLK received by circuit 420.

For example, if N=4, then the initial value of signal D is 0000 ($D_3$ $D_2$ $D_1$ $D_0$). On the first rising edge of CLK, D increases to 0001. On the second rising edge of CLK, D increases to 0010. On the third rising edge of CLK, D increases to 0011. The maximum value of D is 1111 (reached on the 15th rising edge of CLK). When all of the N bits of signal D are high, FSB goes low, and flip-flops 510 stop counting pulses in CLK. The least significant bit of the D signal is $D_0$, and the most significant bit of the D signal is $D_{N-1}$.

At a higher CLK frequency, the digital value of D increases at a faster rate than it does at a lower CLK frequency, because counter 420 receives rising edges of CLK at a faster rate. In another embodiment of circuit 420, digital signal D increases by 1 on each falling edge of clock signal CLK.

Circuit 420 receives another input signal referred to as the Stop signal. The Stop signal is inverted by inverter 512. The output of inverter 512 is coupled to a reset bar input of each of flip-flops 510. The Stop signal going high triggers the reset bar inputs of flip-flops 510. When the reset bar input is triggered, the Q output signals of flip-flops 510 are all reset to zero.

Figure 6:
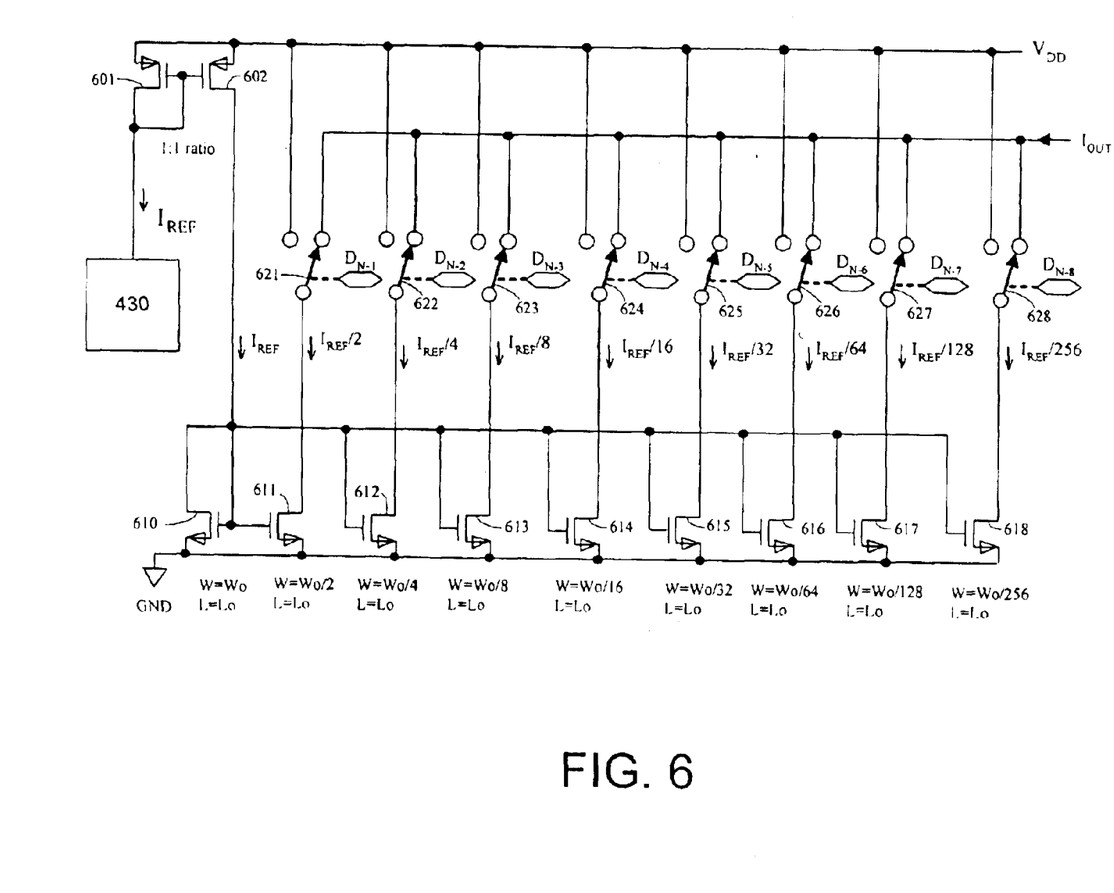
FIG. 6 illustrates an embodiment of a current digital-to-analog converter according to the present invention.

The digital output signal D of circuit 420 and the current signal $I_{REF}$ are received at inputs of digital-to-analog circuit 431. A detailed diagram illustrating an example of circuit 410 is shown in FIG. 6. The circuit of FIG. 6 includes MOSFETs 601–602, MOSFETs 610–618, and switches 621–628.

MOSFETs 611–618 are coupled to switches 621–628, respectively. Although eight switches 621–628 are shown in FIG. 6, circuit 410 can have any number M of switches coupled to an equal number of MOSFETs as shown in FIG. 6. The number M of switches is less than or equal to the number N of bits in binary signal D. An example value for M is 8 as shown in FIG. 6.

MOSFET 601 conducts current $I_{REF}$ from circuit 430, as discussed above. The channel width-to-length (W/L) ratio of transistor 601 and the channel W/L ratio of transistor 602 are the same (1:1 ratio). Transistors 601 and 602 form a current mirror circuit. Therefore, transistor 602 also conducts a current equal to $I_{REF}$.

Each of transistors 611–618 forms a current mirror circuit with transistor 610. Transistors 611–618 conduct currents that are scaled in portion to current $I_{REF}$ in transistor 610. In further embodiments, circuit 410 can have any number of current mirror circuits (along with an equal number of switches controlled by signal D) that conduct currents scaled relative to $I_{REF}$.

Transistor 611 has half the channel width Wo of transistor 610. Therefore, transistor 611 conducts $I_{REF}/2$ (half the current of transistor 610). In FIG. 6, Lo is the channel length of transistors 610–618.

The channel width of transistor 612 is one quarter the channel width of transistor 610. Therefore, transistor 612 conducts $I_{REF}/4$ (one quarter the current conducted by transistor 610). Transistor 613 conducts $I_{REF}/8$, because its channel width is one eight the channel width of transistor 610.

Transistor 614 conducts $I_{REF}/16$, because its channel width is one sixteenth the channel width of transistor 610. Transistor 615 conducts $I_{REF}/32$, because its channel width is 1/32 the channel width of transistor 610.

Transistor 616 conducts $I_{REF}/64$, because its channel width is 1/64 the channel width of transistor 610. Transistor 617 conducts $I_{REF}/128$, because its channel width is 1/128 the channel width of transistor 610. Transistor 618 conducts $I_{REF}/256$, because its channel width is 1/256 the channel width of transistor 610.

Binary bit signals $D_{N-1}$, $D_{N-2}$, $D_{N-3}$, $D_{N-4}$, $D_{N-5}$, $D_{N-6}$, $D_{N-7}$, and $D_{N-8}$ (N=8) from circuit 420 control the switching of switches 621–628, respectively. When one of signals is $D_{N-1}$ through $D_{N-8}$ is low, the corresponding switch 621–628 is coupled to supply voltage $V_{DD}$, and the corresponding transistor 611–618 contributes no current to $I_{OUT}$. For example, when binary signal $D_{N-1}$ is low, transistor 611 is coupled to $V_{DD}$ through switch 621.

When one of signals $D_{N-1}$ through $D_{N-8}$ is high, the corresponding switch 621–628 couples a corresponding one of transistors 611–618 to the inverting input of amplifier 412. The corresponding transistor 611–618 conducts a scaled current value that is added to $I_{OUT}$. For example, when binary bit $D_{N-2}$ is high, switch 622 couples transistor 612 to amplifier 412. The current $I_{REF}/4$ through transistor 612 is added to $I_{OUT}$.

The inverting input of amplifier 412 is a high impedance node. Therefore, the output current $I_{OUT}$ conducted by circuit 410 flows through resistor 411.

Binary signals $D_{N-1}$ through $D_{N-8}$ determine how many of transistors 611–618 add a scaled current value to $I_{OUT}$ at a particular point in time. For example, if D is 01100100, then transistors 612, 613, and 616 conduct currents $I_{REF}/4$, $I_{REF}/8$, and $I_{REF}/64$, respectively. The total output current $I_{OUT}$ equals $(I_{REF} \times (1/4 + 1/8 + 1/64)) = 25/64 I_{REF}$. The current through transistors 611, 614–615, and 617–618 does not contribute to $I_{OUT}$, because switches 621, 624–625, and 627–628 couple these transistors to $V_{DD}$.

At a higher CLK switching frequency, the binary value of D increases at a faster rate. If N=8, binary signal D increases from 00000001 to its highest value 11111111 at a faster rate. As the binary value of D increases, $I_{OUT}$ increases as more of the scaled current flowing through transistors 611–618 is fed into resistor 411.

When D=00000001, $I_{OUT}$ equals $(1/256) \times I_{REF}$. When D=11111111, $I_{OUT}$ equals $(255/256) \times I_{REF}$. $I_{OUT}$ increases from 0 to $(255/256) \times I_{REF}$ regardless of the frequency of CLK. However, $I_{OUT}$ increases to $(255/256) \times I_{REF}$ at a faster rate over a shorter period of time when CLK has a higher frequency.

Amplifier 412 drives the voltage at its output terminal until the voltages at its inverting and non-inverting inputs are substantially equal. As discussed above, the voltage at the non-inverting input of amplifier 412 equals $V_V - V_M$.

Therefore, the voltage at the inverting input of amplifier 412 also equals $V_V - V_M$.

The output voltage $V_A$ of soft start circuit 400 can be calculated based on the current $I_{OUT}$ through resistor 411 ($R_{411}$) as shown in equation (2):

$$V_A - (V_V - V_M) = I_{OUT} R_{411} \qquad (2)$$

Current $I_{OUT}$ is determined by binary signal D and current $I_{REF}$ as discussed above. Substituting an equation for $I_{OUT}$ into equation (2) yields equation (3):

$$V_A = (V_P - V_V + V_M)\left(\frac{R_{411}}{R_{406}}\right)\left(\frac{D_{N-1}}{2^1} + \frac{D_{N-2}}{2^2} + \frac{D_{N-3}}{2^3} + \ldots + \frac{D_1}{2^{N-1}} + \frac{D_0}{2^N}\right) + (V_V - V_M) \qquad (3)$$

In equation (3), it is assumed that N=M (M is the number of switches in circuit 410). One of skill in the art can appreciate that modifications to the notations used in equation (3) can be made when M is less than N.

As can be seen from equation (3), the output voltage $V_A$ of soft start circuit 400 is a function of peak voltage $V_P$, the valley voltage $V_V$, and the margin voltage $V_M$ of ramp signal $V_{RAMP}$. At the beginning of the power-on phase of a DC/DC converter, signal D equal 0. As can be seen from equation (3), voltage $(V_V - V_M)$ equals the starting voltage of $V_A$ when all of signals D equal 0. The initial duty cycle of the switches in the DC/DC converter is 0% if $(V_V - V_M)$ equals the actual valley voltage of $V_{RAMP}$. Circuit 400 is flexible, because the starting voltage of $V_A$ (and the starting duty cycle of the switches) can adjusted simply by changing the value of margin voltage $V_M$.

The peak voltage $V_P$ and the ratio of $R_{411}/R_{406}$ determine the ending voltage of output voltage $V_A$. At the end of the soft start phase, binary signals D from circuit 420 are all ones, and the term in the third parenthetical in equation (3) approaches one. For example, if the ratio of $R_{411}/R_{406}$ equals one, then the $V_V$ and $V_M$ terms cancel out of equation (3), and the ending value of $V_A$ equals $V_P$.

If $R_{411}/R_{406}$ equals one, the duty cycle of the switches is 100% at the end of the soft start period, because the switches remain ON 100% of the time when the output of the error amplifier equals $V_P$. The ratio of $R_{411}/R_{406}$ can be reduced below one to reduce the maximum duty cycle of the switches at the end of the soft start control period. The ratio of $R_{411}/R_{406}$ can be increased to increase the maximum duty cycle of the switches if $V_P$ is less than the actual peak voltage of $V_{RAMP}$ due to an offset.

Because rate of increase in binary signal D is driven by the frequency of clock CLK, the rate at which voltage $V_A$ ramps up from its minimum value to its maximum value is determined by the switching frequency of the output switches. Voltage $V_A$ ramps up at a faster rate at a higher switching frequency and at a slower rate at a lower switching frequency.

Thus, when the switching frequency is greater, the output voltage Vo of a DC/DC converter ramps up to the regulated voltage over a shorter time period. Therefore, the soft start period is reduced, and $V_A$ ramps up to its maximum value over a shorter time period. When the switching frequency is lower, Vo takes longer to ramp up to the regulated voltage. Therefore, the soft start period is increased, and $V_A$ ramps up to its maximum value over a longer time period.

Thus, the present invention provides an effective control of the output voltage Vo of a DC/DC converter during a soft start period. A soft start circuit of the present invention allows the length of the soft start period to be adjusted based on the switching frequency of the switches so that the duty cycle of the switches can be reduced until Vo reaches the regulated value.

According to the present invention, the duty cycle of the switches is dependent on the peak and valley voltages of the PWM ramp signal during the soft start period. The duty cycle of the switches can also be dependent on a margin voltage during the soft start period. According to an embodiment of the present invention, the output voltage of the error amplifier can remain within the voltage range of ramp signal $V_{RAMP}$ throughout the soft start period.

A soft start circuit of the present invention can keep the duty cycle of the switches below 100% throughout the soft start period by adjusting the output of the error amplifier in response to the peak, valley, and margin voltages of $V_{RAMP}$. By keeping the duty cycle of the switches below 100%, the inductor current $I_L$ does not flood capacitor Co during the soft start period before Vo reaches the regulated value.

Further embodiments of the present invention are possible. For example, the principles of the present invention can be used to control the duty cycle of two synchronous switches in a synchronous DC/DC converter during a soft start period. In another embodiment, the present invention can control the duty cycle of one switch in a non-synchronous DC/DC converter during a soft start phase. In this embodiment, the second switch is replaced with a diode. The switches in a DC/DC converter are typically implemented as power MOSFETs.

In further embodiments, the principles of the present invention also apply to boost DC/DC converters and voltage inverting DC/DC converters.

According to another embodiment of the present invention, output voltage $V_A$ decreases during the soft start period. In this embodiment, a binary counter circuit generates a decreasing binary signal D that causes the output current $I_{OUT}$ of circuit 410 to decrease over time. The binary signal D and signal $V_A$ decrease at a faster rate when the switching frequency is greater.

A soft circuit according to this embodiment of the present invention can be applied to control loops as shown in FIGS. 1 and 3. The inverting and non-inverting inputs of PWM comparators 103 and 303 are reversed from the positions shown in FIGS. 1 and 3, respectively, so that the duty cycle of the switches in converter 101 start at 0% and increases during the soft start period.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. A soft start circuit in a control loop, the control loop coupled to a DC/DC converter circuit, the soft start circuit comprising;

a counter circuit that generates a digital signal in response to a clock signal, wherein the clock signal is used to generate a ramp signal that determines a switching frequency of the DC/DC converter;

a voltage-to-current converter circuit that converts at least one voltage indicative of the ramp signal into a current signal; and a digital-to-analog converter circuit that converts the current signal into an output voltage signal that varies at a rate determined by the digital signal, wherein the output voltage signal is applied to an error amplifier during a soft start period.

2. The soft start circuit of claim 1 wherein the voltage-to-current converter converts peak and valley voltages of the ramp signal into the current signal.

3. The soft start circuit of claim 1 wherein the voltage-to-current converter circuit comprises:

an amplifier; and a transistor coupled to an output of the amplifier and an input of the amplifier, wherein the current signal flows through the transistor.

4. The soft start circuit of claim 3 wherein the voltage-to-current converter circuit further comprises:

an adder circuit coupled to receive the valley voltage and a margin voltage that indicates an offset in the ramp signal.

5. The soft start circuit of claim 3 wherein the voltage-to-current converter circuit further comprises:

a resistor coupled to the transistor and the input of the amplifier.

6. The soft start circuit of claim 1 wherein the voltage-to-current converter circuit receives a margin voltage that indicates a voltage offset in the ramp signal.

7. The soft start circuit of claim 1 wherein the digital-to-analog converter circuit further comprises:

a plurality of current mirror circuits, wherein each of the current mirror circuits includes a first transistor that conducts the current signal; and a plurality of switches, wherein each of the switches is coupled to one of the current mirror circuits, and the switches are controlled by the digital signal generated by the counter circuit.

8. The soft start circuit of claim 7 wherein:

each of the current mirror circuits includes a second transistor having a channel width that is a fraction of a channel width of the first transistor.

9. The soft start circuit of claim 7 wherein the digital-to-analog converter circuit further comprises:

a first amplifier having a first input that is coupled to the voltage-to-current converter, and a resister coupled between a second input and an output of the first amplifier, wherein the switches alternately couple the current mirror circuits to the first amplifier and a supply voltage in response to the digital signal.

10. The soft start circuit of claim 9 wherein the voltage-to-current converter circuit comprises:

a second amplifier; and a second transistor coupled to an output of the second amplifier and an input of the second amplifier, wherein the current signal flows through the second transistor.

11. A method for controlling current through an inductor in a DC/DC converter during a soft start period using a control loop, the method comprising:

providing a digital signal that indicates a frequency of a clock signal, wherein the clock signal is used to generate a ramp signal that determines a switching frequency of the DC/DC converter;

converting a voltage indicative of an amplitude of the ramp signal into a current signal; and generating an output voltage in response to the current signal, the output voltage varying at a rate determined by the digital signal, wherein the output voltage is applied to an error amplifier in the control loop during the soft start period.

12. The method of claim 11 wherein providing the digital signal further comprises:

changing a binary value of the digital signal using a plurality of flip-flops each time the flip-flops detect an edge of the clock signal.

13. The method of claim 11 wherein converting the voltage indicative of the amplitude of the ramp signal into the current signal further comprises:

receiving a margin voltage that indicates an offset in the ramp signal; and converting the amplitude voltage and the margin voltage into the current signal.

14. The method of claim 11 wherein converting the voltage indicative of the amplitude of the ramp signal into the current signal further comprises:

amplifying the amplitude voltage using an amplifier; and generating the current signal through a transistor and a resistor coupled to the transistor.

15. The method of claim 11 wherein converting the voltage indicative of the amplitude of the ramp signal into the current signal further comprises:

receiving a first voltage that indicates a maximum value of the ramp signal;

receiving a second voltage that indicates a minimum value of the ramp signal;

receiving a third voltage that indicates an offset in the ramp signal; and subtracting the third voltage from the second voltage.

16. The method of claim 11 wherein generating the output voltage in response to the current signal further comprises:

alternately coupling a first current mirror circuit to a supply voltage and an amplifier in response to a first bit of the digital signal that controls a first switch;

alternately coupling a second current mirror circuit to the supply voltage and the amplifier in response to a second bit of the digital signal that controls a second switch;

alternately coupling a third current mirror circuit to the supply voltage and the amplifier in response to a third bit of the digital signal that controls a third switch; and alternately coupling a fourth current mirror circuit to the supply voltage and the amplifier in response to a fourth bit of the digital signal that controls a fourth switch, wherein the amplifier generates the output voltage at an amplifier output terminal.

17. The method of claim 16 wherein:

the first current mirror circuit comprises a first transistor and a second transistor coupled together;

the second current mirror circuit comprises the first transistor and a third transistor coupled together;

the third current mirror circuit comprises the first transistor and a fourth transistor coupled together; and the fourth current mirror circuit comprises the first transistor and a fifth transistor coupled together.

18. The method of claim 17 wherein:

the second transistor has a channel width-to-length ratio that is one half the channel width-to-length ratio of the first transistor;

the third transistor has a channel width-to-length ratio that is one quarter the channel width-to-length ratio of the first transistor;

the fourth transistor has a channel width-to-length ratio that is one eighth the channel width-to-length ratio of the first transistor; and the fifth transistor has a channel width-to-length ratio that is one sixteenth the channel width-to-length ratio of the first transistor.

19. The method of claim 16 wherein generating the output voltage in response to the current signal further comprises:

coupling a resistor between the amplifier output terminal and an input of the amplifier.

20. The method of claim 16 wherein generating the output voltage in response to the current signal further comprises:

alternately coupling a fifth current mirror circuit to the supply voltage and the amplifier in response to a fifth bit of the digital signal that controls a fifth switch;

alternately coupling a sixth current mirror circuit to the supply voltage and the amplifier in response to a sixth bit of the digital signal that controls a sixth switch;

alternately coupling a seventh current mirror circuit to the supply voltage and the amplifier in response to a seventh bit of the digital signal that controls a seventh switch; and alternately coupling an eighth current mirror circuit to the supply voltage and the amplifier in response to an eighth bit of the digital signal that controls an eighth switch.

21. A DC/DC converter circuit comprising:

an error amplifier, a ramp generator generating a ramp signal that determines a switching frequency of the DC/DC converter; and a soft start circuit hiving an output coupled to the error amplifier and a first input coupled to the ramp generator, wherein the soft start circuit generates a soft start signal at the output coupled to the error amplifier, the soft start signal being generated in response to a signal received at the first input that is indicative of a characteristic of the ramp signal.

22. The DC/DC converter defined in claim 21 wherein the soft start circuit has a second input for receiving a clock signal, and the ramp generator uses the clock signal to generate the ramp signal.

23. The DC/DC converter defined in claim 22 wherein a voltage of the soft start signal increases a rate that is determined by a frequency of the clock signal.

24. The DC/DC converter defined in claim 21 wherein the soft start circuit receives a peak voltage of the ramp signal and a valley voltage of the ramp signal, and generates the soft start signal in response to the peak and valley voltages.

25. The DC/DC converter defined in claim 24 wherein the soft start circuit receives a margin voltage that indicates an offset in the ramp signal, and generates the soft start signal in response to the margin voltage.

26. A method for controlling current through an inductor in a DC/DC converter during a power-on phase, the method comprising:

generating a ramp signal that determines a switching frequency of the DC/DC converter;

generating an error signal using an error amplifier in response to a feedback signal received from an output of the DC/DC converter; and generating a soft start signal using a soft start circuit at an input of the error amplifier in response to a signal that is indicative of a characteristic of the ramp signal, the soft start signal providing a soft start function during the power-on phase of the DC/DC converter.

27. The method defined in claim 26 wherein the soft start signal is generated in response to a clock signal, a voltage of the soft start signal changes a rate that is determined by a frequency of the clock signal, and the clock signal is used to generate the ramp signal.

28. The method defined in claim 26 wherein the soft start signal is generated in response to a peak voltage of the ramp signal, a valley voltage of the ramp signal, and a margin voltage that indicates an offset in the ramp signal.

* * * * *